2,977,331

PROCESS OF STABILIZING CELLULOSE BY IMPREGNATION WITH A SALT OF AN ORGANIC BASIC NITROGEN COMPOUND CONTAINING A HYDROXYL GROUP AND A PARTIAL ESTER OF A POLYHYDRIC ALCOHOL AND POLYCARBOXYLIC ACID AND PRODUCT THEREOF

Walter P. Ericks, Lockport, N.Y., assignor to The Upson Company, Lockport, N.Y.

No Drawing. Filed Oct. 20, 1955, Ser. No. 541,835

4 Claims. (Cl. 260—17.2)

The present invention relates to a process for the treatment of cellulose materials, to compositions employed in such a process and to the treated cellulose product. More particularly, it relates to the treatment of cellulose materials to improve their dimensional stability upon being subjected to humidity changes in the surrounding atmosphere.

In my prior patents Reissue 24,003, Reissue 24,011, Reissue 23,866 and 2,692,183, I have shown that cellulose materials may be greatly improved as to their dimensional stability by impregnating them with a wide variety of organic compounds having a plurality of hydroxyl groups attached to different carbon atoms in the molecule. In the stabilizing compounds disclosed by Patents Reissue 23,866, Reissue 24,003 and 2,692,183, at least one of the hydroxyl groups is part of a carboxyl group. While these carboxyl group containing compounds are quite effective as stabilizing agents, certain disadvantages are encountered in the use of many of them and these disadvantages are overcome by the present invention.

Many of the carboxylic acid type stabilizers are quite acid in nature. In solutions, they often exhibit a pH of 2 or lower and thus are quite corrosive in nature. They will readily attack metal containers in which they are shipped and seriously damage the equipment used in the impregnation of cellulose materials with the compounds in question.

Also, many of the stabilizers which contain carboxyl groups are not sufficiently soluble in water so that it may be used as a solvent in impregnating solution. Therefore, to use them as impregnants of cellulose materials, it has often been necessary to dissolve them in a volatile organic solvent or a mixture of the solvent and water. Such solvents are all expensive and complicated procedures must be devised for their recovery for subsequent re-use. Moreover, many of the volatile organic solvents which must be used are highly inflammable and toxic in nature and create dangerous fire and health hazards.

These problems have been solved in part by the invention described in my copending application Serial No. 426,599 filed April 29, 1954. In accordance with the teaching of this application, the acid type stabilizers are reacted at least in part with ammonia or a volatile amine so that they are rendered water soluble and their acidity in solution is greatly reduced. However, after impregnation of cellulose materials with the ammonia salts of the stabilizing compounds, the ammonia is volatilized during the drying operation and the carboxyl group regenerated. It has been found that for a number of specialized uses, it will be necessary to control the acidity of stabilized cellulose materials by impregnating them with a solution of a stabilizing compound having a pH within a range of 3.0 to 9.0 and most often within a range of 4 to 7 with the stabilizing compound being such that it does not become more acid in nature after impregnating and drying. It is often necessary to treat or coat the cellulose product, after stabilization, with materials which are adversely affected by highly acidic stabilizers. For instance, if the base sheet of a photographic paper is stabilized with a carboxyl group containing compound, the subsequently applied light sensitive emulsions will deteriorate at an accelerated rate.

As pointed out above, the use of ammonia and volatile amines for constant control of the acidity of impregnated cellulose materials is precluded by their volatility. Other alkalis, such as sodium and potassium hydroxides and carbonates, are not suitable for controlling the pH of impregnating solutions and acidity of the impregnated cellulose product because they tend, when added in sufficient amount to produce a pH of the solution between 3 and 7, to seriously diminish the effectiveness of the stabilizer and when added in an amount to produce a pH above 7, to destroy it entirely.

The present invention effectively solves the problems outlined above.

It is the object of the present invention to provide a simple, effective and inexpensive method for dimensionally stabilizing cellulose materials against humidity variations of the atmosphere with a stabilizer which is normally quite acid in reaction but whose acidity is carefully controlled.

Another object of the invention is to provide a process which will be non-hazardous in operation.

Still another object of the invention is to provide a process which can be carried out in relatively inexpensive equipment.

A further object of the invention is to provide an impregnating composition for dimensionally stabilizing cellulose material which may be easily handled, stored for long periods of time and transported considerable distances.

Yet another object of the invention is to provide an impregnating composition for dimensionally stabilizing cellulose material which will not deleteriously affect the cellulose article or materials with which it is subsequently treated.

Yet another object of the invention is to provide cellulose products stabilized against expansion and contraction upon being subjected to varying humidity conditions in the atmosphere which will itself remain stable and will not affect other materials with which it is contacted.

Other and further objects of the invention will be apparent from the following detailed description.

The present invention is applicable to any material having the characteristic cellulose structure, which may be expressed by the structural formula

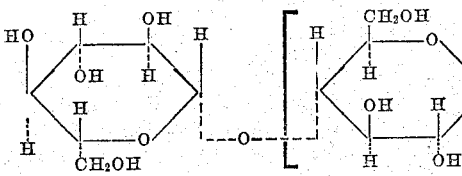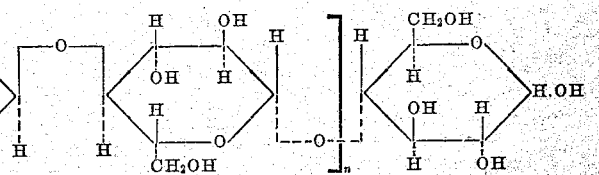

Thus, the cellulose of the material being stabilized may be in its original fibrous form or it may have been dissolved or modified in an appropriate reagent and then regenerated so long as the cellulose structure is present in the final material.

Also, it should be pointed out that the invention is not limited to any particular physical form. Such widely divergent materials as paper sheets, cardboard, structural fiber board, woven cloth of natural or regenerated cellulose fibers, wood products whether whole or laminated, and regenerated cellulose sheets (cellophane) may be dimensionally stabilized against humidity changes by the present process and compositions. The greatest expansion and contraction due to change in relative humidity will always occur in a direction perpendicular to that at which the major portion of the cellulose molecules is oriented. In the case of wood fibers, the predominant orientation will be parallel the axes of the fibers and in the case of regenerated cellulose sheets, it will be in the direction of the travel of the sheets through the machine on which they are formed.

I have found that permanent control of the acidity of polyhydroxy compounds which stabilize such cellulose materials against expansion and contraction upon exposure to varying humidity of the surrounding atmosphere and in which at least one of the hydroxyl groups is part of a carboxyl group may be effected by reacting the stabilizer with an organic basic nitrogen compound having at least one hydroxyl group attached to a carbon atom in the molecule to form the corresponding salt. The salt, itself, has the ability to dimensionally stabilize cellulose material and it is not necessary to regenerate the original stabilizer in the product. The degree of dimensional stabilization may be somewhat affected (adversely in some instances and favorably in others) but in no case is the property of dimensional stabilization destroyed or radically altered. Thus the original stabilizer need not be regenerated after impregnation of the cellulose material and control of acidity is permanent.

For a disclosure of the original stabilizers of an acid nature which are reacted with a hydroxyl group containing organic basic nitrogen compound in accordance with the present invention, reference is made to my previous Patents Nos. 2,629,248; 2,692,183; and 2,629,701. Patent 2,629,648 discloses the stabilization with polycarboxylic acids of cellulose materials against expansion and contraction on humidity changes in the atmosphere and specifically names a large number of such acids which are suitable for this purpose. It will be noted that the polycarboxylic acids may be aliphatic or aromatic in nature.

In addition to the polycarboxylic acids named in Patent 2,629,648, although clearly contemplated within its scope, are the so-called adducts, which are formed in accordance with the well-known Diels-Alder reaction whereby an unsaturated polycarboxylic acid, or its anhydride, in which ethylenic bonds are activated by the carboxyl groups, are reacted with a conjugated diene. This last mentioned compound may itself be a carboxylic acid in which case there will be formed an acid having at least three carboxyl groups in a molecule. As examples of such adducts may be mentioned the reaction product of eleostearic acid and maleic anhydride and the adduct formed by reacting abietic acid with maleic anhydride.

Another type of particularly suitable stabilizing compound which contains a plurality of carboxyl groups and thus falls within the broad class of polycarboxylic acids, although not specifically named in Patent 2,629,648, are the polyacid esters formed by reacting an excess of a polycarboxylic acid with a polyhydric alcohol so that at least two of the hydroxyl groups of the alcohol are completely esterified, but leaving free carboxyl groups from unsatisfied portions of the polycarboxylic acid molecules. When reacting a dihydric alcohol with a dicarboxylic acid to form a diacid ester, the theoretical proportions will comprise the reaction of 2 mols of acid to 1 mol of alcohol. The resulting products will contain two free carboxyl groups in each of their molecules and hence they may be quite acid in nature. They may be completely or partially neutralized in accordance with the present invention and form very efficient stabilizers of cellulose material against expansion and contraction due to humidity variations.

Patent 2,692,183 discloses the use of hydroxy carboxylic acids as dimensional stabilizers for cellulose. This patent lists a large number of such acids, all of which are suitable for use in accordance with the present invention, and therefore additional examples of this type of stabilizing compound having an acid reaction need not be further named here.

In Patent 2,629,701 there is disclosed the dimensional stabilization of cellulose materials by impregnating them with partial esters formed by reacting aliphatic polyhydric alcohols with polycarboxylic acids in a manner fully set forth therein so that at least one free carboxyl group remains in the final molecule. When dihydric alcohols and dicarboxylic acids are employed, they will ordinarily be reacted together in substantially equimolecular proportion and the reaction carried on until approximately one-half of the hydroxyl groups of the dihydric alcohols have been reacted with half of the carboxyl groups of the dicarboxylic acids as determined by the reduction in the original acid number in the mixture to approximately one-half. When the polyhydric alcohol contains more than two hydroxyl groups, or the carboxylic acid contains more than two carboxyl groups, or when both reactants have more than two reactive groups, the same general rule holds true. There should be at least one unreacted or free hydroxyl group on the residue of the polyhydric alcohol and at least one unreacted or free carboxyl group on the residue of the polycarboxylic acid in the molecule of the resulting partial ester. It will be apparent that with polyhydric alcohols having more than two hydroxyl groups, the resulting partial ester may contain two or more hydroxyl groups on the residue of the polyhydric alcohol, and similarly, with polycarboxylic acids having more than two carboxyl groups there may be two or more carboxyl groups on the residue of the carboxylic acid. Thus most of the partial esters are quite acid in nature and their use as dimensional stabilizers for cellulose may be restricted by this fact as pointed out earlier. This restriction is removed, however, by the practice of the present invention whereby their acidity may be completely or materially reduced without a serious reduction in their stabilizing effect. As before, it will be unnecessary to name the partial esters in this specification since a large number are listed in my Patent 2,629,701 and they are similarly suitable for use in the present invention.

The basic compounds which may be used to permanently adjust the acidity of the carboxyl group containing stabilizers mentioned above, are capable of wide variation. As pointed out earlier, it is necessary that these neutralizing compounds be basic organic nitrogen compounds having at least one hydroxy group attached to a carbon atom in the molecule. A very large number of such compounds has been tested and the reaction products have all been found to exert a dimensional stabilizing effect on cellulose materials, although, of course, certain of the reaction products will exert a greater stabilizing effect than others, as will be seen from the examples to be set forth hereinafter.

A particularly suitable type of neutralizing compound to be employed in the practice of the present invention is represented by the alkanolamines. By this term is meant all organic compounds having an alcoholic residue attached to the nitrogen atom of an amino group. They may be mono-, di- or tri-alkanolamines and they may be substituted in both the amino and alcoholic portions of the molecule. The alkanolamines contemplated for use in the present invention may be expressed by the structural formula $$R-N(R_1)-R_1OH$$

in which R and R₂ are hydrogen or an alkyl, acyl, aryl, alkaryl, hydroxyalkyl, hydroxyaryl, or hydroxyalkaryl radical and may be the same or different and R₁ is an alkyl radical.

Of the alkanolamines, the preferred compounds are mono-, di- and tri-ethanolamine because they are readily commercially available at a reasonable price and their reaction products with the various dimensional stabilizers of acid reaction provide very efficient materials for the dimensional stabilization of cellulose. It is to be understood, of course, that the various ethanolamines may be employed singly or in admixture with each other. Amongst other alkanolamines which are suitable for use in the present invention may be named the following: dimethyl ethanolamine; phenyl methyl ethanolamine, dimethyl isopropanolamine, N-acetyl ethanolamine, diethyl ethanolamine, phenyl ethanolamine, phenyl diethanolamine, monoisopropanolamine, phenyl ethyl ethanolamine, 2-amino-2-methyl-1-propanol, N.N.dibutyl isopropanolamine, α-methyl benzyl monoethanolamine, N-methyl diethanolamine, diisopropanolamine, triisopropanolamine and the like.

Alkanol substituted polyamines may also be used as the neutralizing compound by the formation of reaction products with cellulose stabilizing compounds of acid reaction and as examples of such compounds may be mentioned N, N, N', N'-tetrakis (2-hydroxypropyl) ethylenediamine, known by the trade name "Quadrol," and 2-(2-aminoethylamine)-ethanol.

Another group of basic organic nitrogen compounds which may also be used for adjusting the pH's of solutions of the acidic cellulose stabilizers are heterocyclic organic nitrogen compounds having at least one hydroxyl group attached to a carbon atom in the molecule. One type of compound belonging to this group would be one in which an alkanol group is attached to a nitrogen atom in the ring. Examples of such compounds are N-hydroxyethyl morpholine and alkanol substituted glyoxalidines, such as a compound having the trade name Amine 220 and the formula

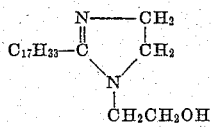

Another example of heterocyclic nitrogen compounds falling within this general group is 8 quinolinol.

It has been pointed out earlier that my copending application Serial No. 426,599 discloses the stabilization of cellulose materials employing ammonium salts of the various acid stabilizers, but that the fact that the original acid stabilizer is regenerated on drying the impregnated products makes their use disadvantageous for many purposes. It has been found with respect to the present invention that alkanol substituted ammonium hydroxides provide neutralizing compounds for the various types of carboxyl group containing stabilizers and the original stabilizer is not regenerated on drying of the impregnated cellulose material. As an example of this type of neutralizing compound may be mentioned tetraethanolammonium hydroxide.

As would be expected, the amino glycols as a group have been found satisfactory for lowering the acidity of the carboxyl group containing cellulose stabilizing compounds. Examples of such compounds are 2-amino-2-(hydroxymethyl) 1,3-propanediol and 2-amino-2-ethyl-1,3-propanediol.

Still another type of organic basic nitrogen compound which may be employed are the aminoaryl substituted aliphatic alcohols and as an example of this type of compound may be mentioned p-aminophenylethylalcohol.

The amino phenols are also suitable for use in connection with the present invention and p-amino phenol may be mentioned as an example of this type of compound.

In addition, various other basic organic nitrogen compounds having at least one hydroxyl group attached to a carbon atom in the molecule may be employed to neutralize the acid cellulose dimensional stabilizing compounds. In fact, as pointed out earlier, applicant has reacted a very large number of basic organic nitrogen compounds which have hydroxyl groups attached to a carbon atom with the carboxyl group containing stabilizers disclosed herein and in his prior patents and all such reaction products have been found to exert to some degree, a cellulose dimensional stabilizing effect.

The reaction between the carboxyl group containing stabilizing compound and the basic organic nitrogen compound which results in neutralization or partial neutralization of the former is ordinarily the formation of a salt. The reaction is preferably carried out in an aqueous medium and the resulting solution may itself be used to impregnate cellulose materials with or without further concentration or dilution. The reaction is often exothermic and the heat generated aids in dissolving the solids present to form a true solution but if the heat of reaction is not sufficient, heat from an external source may be applied. Temperatures up to 100° C. are suitable for carrying out the neutralization reaction but the preferred range is from 30 to 60° C.

It is entirely possible that during the application of heat incident to the drying of the impregnated cellulose articles, the carboxylic acid salts formed during neutralization may be converted wholly or in part to amides or imides and, in fact, it is believed that this does occur. Amide and imide formation is also encouraged when an anhydride of a polycarboxylic acid is used in place of the acid, itself. The formation of amides and imides, however, does not materially affect the dimensional stabilizing property since the hydroxyl groups are not affected.

As indicated, in many instances it is not necessary to neutralize completely the acid stabilizer. For different purposes it is desirable to adjust the pH to any value within the pH range of approximately 3 through 9, inclusive, although, as indicated earlier, a range of 4 to 7 would be desired in most instances, and it is obvious that only the necessary amount of the basic nitrogen compound will be employed to adjust the pH to the desired value. This amount will obviously vary from that required to neutralize only a minor proportion of the acid stabilizer to an amount which will neutralize all of the stabilizer and leave an excess of the basic compound where a high pH is desired. In the case of polycarboxylic acids, it is possible to react a portion but not all of the carboxyl groups of the molecule to form an acid salt, which will have a pH within the desired range when dissolved.

The reaction of the basic nitrogen compound will usually produce a salt which is sufficiently water soluble to permit impregnation of the cellulose materials with water solutions. In a relatively small number of cases, however, particularly when the original stabilizer is not completely neutralized, it will be necessary to dissolve the stabilizer in a mixture of water and an organic volatile hydrophylic solvent for the stabilizer in question. In no instance, however, has it been found necessary to employ a solvent containing more than 50% of the organic liquid. Examples of organic solvents which may be employed in admixture with water are alcohols such as methyl, ethyl and propyl alcohols and ketones such as dimethyl, diethyl, methyl ethyl, methyl propyl or ethyl propyl ketones.

It will be understood, therefore, that when the expression "aqueous solution" is employed in the claims, it includes not only a solution in water alone, but a solution in water admixed with a sufficient amount of an organic volatile hydrophylic solvent to dissolve the stabilizing compound.

The cellulose material being treated may be impregnated with an aqueous solution of the neutralized or partially neutralized carboxyl group containing stabilizing agents by any suitable means, but immersion in the solution has been found the best procedure in most cases. To insure uniformity of results, it is best that the cellulose material be completely impregnated and the time necessary for complete impregnation can vary from a few seconds up to several minutes or even longer, depending on the nature and dimensions of the cellulose material and whether or not it has been previously treated with a material which will resist absorption of the impregnating solution. It is obvious, for example, that a thin paper sheet will be impregnated much faster than a fiber board sheet of several thousandths of an inch thickness. After complete impregnation, it has been found convenient to remove excess solution by running the cellulose material through the nip of a pair of pressure rolls set at a relatively light pressure.

During impregnation, the impregnating solution may be maintained at substantially any desired temperature although the usual impregnating temperatures will range between 20° C. and 50° C. However, temperatures as high as 100° C. may frequently be employed, it being borne in mind that greater quantities of the stabilizing material can be dissolved at higher temperatures.

After complete impregnation, the cellulose material is heated to dry the product. When water alone is used as the solvent for the stabilizing compound, no solvent recovery problem is presented, since it may merely be discharged into the atmosphere. While the temperature at which the cellulose material is heated during the drying operation is not critical, it should be above 100° C. to drive off water rapidly, but no practical advantage is obtained by heating above 150° C. A range of 130 to 140° C. is preferred in most instances. As explained earlier, amide and imide formation may be promoted at these temperatures but no material decrease in the dimensional stabilization effect is brought about by this reaction. Also, when free carboxyl groups are present in the stabilizer they may react during heating with the hydroxyl groups of either the stabilizer or cellulose forming esters.

The concentration of the impregnating solution will be determined by the amount of stabilizer to be introduced into the cellulose material being treated. While the stabilizing effect is dependent upon the quantity of the stabilizing compound incorporated in the cellulose material being treated, this quantity can vary widely. The exact quantity to be incorporated will be determined by the type of material, the nature of the stabilizing compound and the amount of the usual expansion or contraction upon subjection to varying humidity conditions which it is desired to remove. Under certain conditions of use, the removal of as little as 12% or 15% of the normal expansion or contraction of a cellulose article may be all that is necessary, whereas under other conditions of use, it may be desirable to remove 50, 60 or 70%, or more, of the normal expansion or contraction. In most instances, at least 5% of the neutralized or partially neutralized carboxyl group containing stabilizing compound of the present invention is required to bring about any appreciable dimensional stabilization of a cellulose material and there is seldom any reason to incorporate more than 50% of stabilizing material into the cellulose article based on the dry weight of the article. In general, a range of 10 to 40% is preferred.

Having determined the amount of the stabilizer, which is to be incorporated, it is a simple matter to determine what should be the proper concentration of the impregnating solution. By simple tests, the amount of solution which will be absorbed on complete impregnation may be determined, and the concentration of the solution is adjusted accordingly. Most fibrous cellulose materials, such as paper and fiber board sheets, will absorb something over their dry weight of impregnation solution when the same is an aqueous medium.

As disclosed in my earlier patents and application, the fixation of the stabilizing compounds in the cellulose material may be enhanced by employing them in combination with the thermosetting resins, although the inclusion of such resins is not an essential feature of the invention. If employed, it is preferred that the thermosetting resin in an early stage of its condensation be included in the impregnating solution which includes the stabilizer and, therefore, a resin which is soluble or at least readily dispersible in water at such a stage should be selected. A ureaformaldehyde type resin has been found very suitable for use in the present process and water soluble forms are readily available on the open market. One such resin is known to the trade as Urac 180.

Another water soluble thermosetting resin which may be used to advantage is that formed by the condensation of melamine with formaldehyde and again such a resin is available on the open market, one particular form being known to the trade as Melmac 405.

Several forms of water soluble phenolformaldehyde resins are also readily available and this form of resin is also very suitable for use with the stabilizer compositions of the present invention.

The amount of thermosetting resin to be incorporated in the cellulose product may be varied widely depending on the nature of the product and the use for which it is intended. The larger the amount of thermosetting resin present, the greater will be the strength and water resistance of the product, but, on the other hand, its flexibility will be adversely affected although, it may be stated, that the stabilizers of this invention have a pronounced plasticizing effect on the thermosetting resin. In general, the amount of thermosetting resin present in the final product based on its dry weight will be between 5 and 50% and again, it is a simple matter to determine the resin concentration in the impregnating solution, which will assure that the desired amount of the resin is taken up by the cellulose material.

Another aspect of the present invention, which, however, is not to be considered an essential feature, is the incorporation in the impregnating solution of various water-proofing and sizing agents in emulsion or dissolved form. An emulsion of micro crystalline paraffin wax, which may contain 50% solids, has been found particularly suitable for producing a water resistant product. The wax is kept in suspension by an emulsifying agent, which may be of the ionic or nonionic type. As exemplary, triethanolamine oleate may be mentioned as a suitable anionic dispersing agent, didodecyl monomethyl pyridinium chloride forms a suitable cationic type of dispersing agent and nonaethylene glycol laurate may be mentioned as a suitable surface active agent of the nonionic type.

Latexes of natural or artificial rubbers also serve as effective water-proofing agents.

In the use of impregnating solutions containing waterproofing agents dispersed therein in emulsion form, the solutions of the stabilizers appear to readily and swiftly penetrate to the interior of the cellulose material being treated; whereas the water-proofing agents collect on the surface and are affixed thereon by the subsequent heating step. The final products have a greatly increased resistance to water, absorbing far less than is the case with untreated products.

The amount of water-proofing agent employed is not particularly critical, but usually will be in an amount sufficient to deposit on the final product about 1 to 5% of the agent based on the dry weight of the product.

Other treating agents may advantageously be included in the cellulose impregnating solutions of this invention. For example, for certain purposes, it has been found desirable to include a proteinaceous size, such as glue or gelatin, in a soluble or water dispersible form. The amount of size included will depend upon the intended use of the cellulose product but will usually be enough to incorporate in or on the cellulose material 2 to 15% of the proteinaceous size based on the dry weight of the material.

The following examples illustrate the dimensional stabilization of cellulose materials with various carboxyl group containing stabilizers at least partially neutralized with a large number of hydroxyl group containing basic organic nitrogen compounds:

I. *Reaction products with alkanolamines*

A. MONOALKANOLAMINES

*Example 1.*—158 parts of gallic acid (1 mol) and 61 parts of monoethanolamine (1 mol) were stirred with 510 parts of water until the exothermic reaction subsided and a dark brown solution was formed. The reaction product thus produced was used with and without dilution in water for impregnating cellulose fiber sheets having dimensions of 12" across the fiber direction, 2" in the fiber direction and .042" thick. These sheets were prepared on a cylinder paper machine from unsized newsprint stock. The impregnation of the sheets was carried out by keeping them submerged in the impregnating liquid at 60° C. until a control sample showed that the sheets were completely impregnated. The samples were then dried and heated at 130° C. for 60 minutes. These sheets were measured accurately when dry and also after conditioning at 90% relative humidity at 37.8° C. The results compared with those of untreated sheets showed that sheets impregnated with 30% and 15% solutions of the reaction product described in this example lost 89% and 31%, respectively, of their normal hygroexpansivity. The pH value of the impregnating solutions was 7.4.

*Example 2.*—146 parts of adipic acid (1 mol) and 61 parts of monoethanolamine (1 mol) were stirred with 483 parts of water allowing the temperature to rise spontaneously until the exothermic reaction subsided. The resulting solution was clear and colorless at 65° C. and had a pH value of 5.1. The solution thus produced was divided into two portions, one of which was left undiluted so as to contain 30% of the reaction product and the other of which was further diluted with water so as to contain 15% of the reaction product. Cellulose fiber sheets prepared on a cylinder paper machine from unsized newsprint stock and having dimensions of 12" across the fiber direction, 2" in the fiber direction, and .042" thick were completely impregnated with the two solutions. Impregnation of the sheets was carried out by keeping them submerged in the impregnating liquid at 65° C. temperature until a control sample showed that the sheets were completely impregnated, then they were dried and heated at 130° C. to a constant weight. These sheets, and samples of untreated sheets, dried and heated in like manner, were measured accurately when dry and also after conditioning at 90% relative humidity at 37.8° C.

The evaluation of their dimensional stability showed that sheets impregnated with 30% and 15% solutions of the reaction product of this example lost 84% and 53%, respectively, of contraction and expansion which normally occurs under variation of relative humidity within the limits indicated in this example.

*Example 3.*—146 parts of adipic acid (1 mol) and 122 parts of monoethanolamine (2 mols) were stirred with 628 parts of water until the spontaneous temperature rise was no longer noticeable. The resulting solution was clear and colorless at 60° C. and its pH was 6.8.

Cellulose fiber board strips after impregnation with 15% and 30% aqueous solutions of the dimensional stabilizer of this example contained 24% and 34% of the reaction products and they lost 33% and 79%, respectively, of their normal ability to contract and expand due to humidity variation in the atmosphere.

*Example 4.*—146 parts of adipic acid (1 mol) and 89 parts of dimethyl ethanolamine (1 mol) were stirred with 549 parts of water until the resulting exothermic reaction was completed. The yellowish solution obtained was clear at a temperature of 50–60° C. and its pH was 5.5.

Impregnated fiber board strips containing 22.5% and 34.3% of the reaction product of this example lost 29% and 76%, respectively, of their ability to contract and expand when exposed to humidity variation in the atmosphere.

*Example 5.*—146 parts of adipic acid (1 mol) and 152 parts of phenyl methyl ethanolamine (1 mol) were stirred with 350 parts of water, and 350 parts isopropyl alcohol. The resulting solution was clear at 50° C. and had a pH value of 4.9. The contraction and expansion of the impregnated cellulose board strips containing 12%, 18% and 31.5% of the reaction product of this example was reduced by 50%, 71% and 96%, respectively.

*Example 6.*—188.2 parts of azelaic acid (1 mol) and 61 parts of monoethanolamine (1 mol) were reacted in 582 parts of water until the ensuing exothermic reaction subsided. The resulting clear solution was amber colored at 50° C. and had a pH of 5.5. The contraction and expansion of the impregnated cellulose fiber board strips containing 14.9%, 22.6% and 35.6% of the reaction product of this example was reduced by 13%, 31% and 75%, respectively, under varying humidity conditions of the atmosphere.

*Example 7.*—188.2 parts azelaic acid (1 mole) and 20.3 parts of monoethanolamine (⅓ mol) were reacted in 487 parts of water until the ensuing exothermic reaction subsided. The clear amber colored solution at 65° C. thus obtained had a pH of 4.9. The contraction and expansion of impregnated cellulose fiber board strips containing 18%, 28% and 40.2% of the reaction product of this example was reduced by 52%, 65% and 68%, respectively, under varying relative humidity.

*Example 8.*—188.2 parts of azelaic acid (1 mol) and 122.16 parts of monoethanolamine (2 mols) were stirred in 725 parts of water until the ensuing exothermic reaction subsided. The red colored solution thus obtained had a pH of 7.8. The contraction and expansion of treated cellulose fiber board strips containing 13%, 23% and 31.4% of the reaction product of this example was reduced by 28%, 43% and 86%, respectively, when the impregnated strips were subjected to conditions of varying humidity in the atmosphere.

*Example 9.*—98 parts of maleic anhydride (1 mol) and 61 parts of monoethanolamine (1 mol) were reacted in 371 parts of water until the ensuing exothermic reaction subsided. The resulting clear and colorless solution at 60° C. had a pH of 3.5.

The contraction and expansion of the impregnated cellulose fiber board strips containing 24.2% and 39.9% of the reaction product of this example was reduced by 30% and 72%, respectively, when they were subjected to varying conditions of relative humidity.

*Example 10.*—196 parts of maleic anhydride (2 mols) and 61 parts of monoethanolamine (1 mol) were mixed with 601 parts of water. When the exothermic reaction thus produced subsided a clear solution at 55° C. was obtained having a pH value of 1.7.

Cellulose fiber boards impregnated with 7.5%, 15% and 30% solutions of the reaction product of this example contained 10.6%, 18.9% and 30.9% of the dimensional stabilizer of this example and lost 22%, 40% and 60%, respectively, of their original ability to contract and expand with variation of relative humidity in the atmosphere.

*Example 11.*—134 parts of malic acid (1 mol) and 61 parts of monoethanolamine (1 mol) were stirred with 455 parts of water. After cessation of the ensuing exothermic reaction a clear colorless solution was produced at 60° C.

Cellulose fiber board impregnated with solutions of various concentration of the product of this example possessed improved dimensional stability when subjected to variation of humidity in the atmosphere.

*Example 12.*—268.2 parts of malic acid (2 mols) and 61 parts of monoethanolamine (1 mol) were stirred in 766 parts of water. A clear colorless solution resulted at 60° C.

The contraction and expansion of impregnated cellulose fiber board strips containing 21.4% and 35.2% of the reaction product of this example was reduced by 13% and 61%, respectively.

*Example 13.*—148 parts of phthalic anhydride (1 mol) was stirred with 487 parts of water at 100° C. This mixture was allowed to cool and then 61 parts of monoethanolamine (1 mol) was added to produce a clear solution of the monoethanolamine acid salt at 60° C. having a pH value of 4.1.

Cellulose fiber board strips impregnated with aqueous solutions of various concentrations of the reaction product of this example contained after drying 13.8%, 23.7% and 39.8% of the reaction product and lost 16%, 36.5% and 70%, respectively, of their ability to contract and expand under humidity variation in the atmosphere.

*Example 14.*—58 parts of succinic anhydride (1 mol) and 61 parts of monoethanolamine (1 mol) were stirred in 277 parts of water until the ensuing exothermic reaction subsided.

Cellulose fiber strips impregnated with an aqueous solution of the reaction product of this example contained 32.6% of the product and lost 45% of its normal hygroexpansivity.

*Example 15.*—116 parts of succinic anhydride (2 mols) and 61 parts of monoethanolamine (1 mol) were reacted in 413 parts of water with spontaneous evolution of heat. The pH of the resulting solution was 3.7. At 60° C. the solution was yellowish in appearance.

Cellulose fiber board strips impregnated with various concentrations of the solution of this example contained 15.8%, 23.1% and 38.3% of the reaction product and lost 4%, 34% and 76%, respectively, of their ability to contract and expand when exposed to humidity variation in the atmosphere.

*Example 16.*—101 parts of sebacic acid (½ mol) was mixed and heated in 177 parts of water until the mixture was homogeneous. This was followed by the addition of 61 parts of monoethanolamine (1 mol). The resulting clear amber colored solution had a pH of 7.0.

Cellulose fiber board strips impregnated with 7.5, 15 and 30% solutions of the reaction product of this example lost 15%, 40% and 98%, respectively, of their ability to contract and expand under humidity variations in the atmosphere.

*Example 17.*—202 parts sebacic acid (1 mol), 926 parts of water and 206.4 parts of dimethyl isopropanolamine (2 mols) were stirred until a clear solution was formed. When the slightly exothermic reaction subsided a clear yellow colored solution was formed which had a pH value of 7.2.

The impregnated fiber board strips containing 9.7%, 15.0% and 25.6% of the reaction product of this example lost 27%, 45% and 73%, respectively, of their normal hygroexpansivity under varying humidity in the atmosphere.

*Example 18.*—302.4 parts abietic acid (1 mol) and 103.0 parts maleic anhydride (1.05 mol) were heated and stirred at 150° C. for 90 minutes to form the abietic acid-maleic acid anhydride adduct.

400.5 parts of above mentioned abietic acid-maleic acid anhydride adduct (1 mol) and 122.16 parts of monoethanolamine (2 mols) were reacted in 1,224.3 parts of water.

This reaction was only slightly exothermic, hence, the mixture was heated to 90° C. to form a clear amber colored solution. Its pH was 6.7. Aqueous solutions of the reaction product thus produced were used for impregnating cellulose fiber sheets prepared on a cylinder paper machine from unsized newsprint stock and having dimensions of 12" across the fiber direction, 2" in the fiber direction, and 0.063" thick.

Impregnation of the sheets was carried out by keeping them submerged in the impregnating liquid at 60° C. until a control sample showed that the sheets were completely impregnated. The sheets were then dried at 130° C. for 60 minutes. These impregnated sheets and samples of untreated sheets were measured accurately when dry and also after conditioning at 90% relative humidity at 37.8° C.

The evaluation of hygroexpansivity showed that sheets impregnated with 15% and 7.5% solutions of the reaction product of this example lost 42% and 28%, respectively, of contraction and expansion, which normally occurs under variation of relative humidity, within the limits indicated in this example.

*Example 19.*—192 parts of anhydrous citric acid (1 mol) and 61 parts monoethanolamine (1 mol) were reacted in 592 parts of water until the exothermic reaction subsided. The resulting clear, colorless solution, pH 3.4, was used in the impregnation of cellulose fiber board strips.

Strips containing 33.3% of the reaction product of this example lost 62% of their ability to contract and expand due to humidity variations in the atmosphere.

*Example 20.*—384 parts of anhydrous citric acid (2 mols) and 61 parts of monoethanolamine (1 mol) were reacted together in 1,042 parts of water until the exothermic reaction subsided. A clear, colorless solution resulted at 50–60° C. with a pH value of 2.9.

Cellulose fiber board strips impregnated with solutions containing various quantities of the reaction product of this example showed the following improvements in dimensional stability:

| Reaction Product in impregnating solution, Percent | Reaction Product in sheet, Percent | Expansion removed, Percent |
| --- | --- | --- |
| 7.5 | 9.5 | 15 |
| 15.0 | 23.4 | 54 |
| 30.0 | 38.6 | 74 |

*Example 21.*—300.5 parts of monohydroxystearic acid (1 mol) and 122 parts of monoethanolamine (2 mols) were reacted in 1,000 parts of water. A clear, colorless solution was obtained at temperatures above 65° C. Its pH was 9.0.

Impregnated cellulose fiber strips containing, after drying, 18.5% and 22.7% of the reaction products of this example lost 51% and 60%, respectively, of their ability to contract and expand due to humidity variations in the atmosphere.

*Example 22.*—316.5 parts of dihydroxystearic acid (1 mol) and 61 parts of monoethanolamine (1 mol) were reacted by stirring in 880 parts of water. A clear reddish brown solution was obtained at 65° C. which had a pH value of 6.8. The improvement in dimensional stabilization of cellulose fiber strips impregnated with the solution of the reaction product of this example is given in tabulated form.

| Reaction Product in impregnating solution, Percent | Reaction Product in sheet, Percent | Expansion removed, Percent |
| --- | --- | --- |
| 15 | 21.6 | 43 |
| 7.5 | 14.9 | 32 |

*Example 23.*—200 parts of polyethylene glycol 200 were mixed with 146 parts of adipic acid. The mixture was stirred and heated at 155° C. for 30 minutes, after which the titration of a sample indicated that the formation of the monoester was completed.

328 parts of this above mentioned polyethylene glycol 200 adipic acid monoester (1 mol) and 61 parts of monoethanolamine (1 mol) were reacted with 906 parts of water. This reaction was exothermic and produced a yellow tinted, clear solution at a temperature of 60° C. Its pH was 7.0. The reaction product thus obtained was divided into three portions, the first of which was left undiluted, to contain 30% of the reaction product, the second of which was diluted with water to contain 15% of the reaction product and the third of which was diluted with water to contain 7.5% of the reaction product. Cellulose sheets prepared on a cylinder paper machine from unsized newsprint stock and having dimensions of 12" across the fiber direction, 2" in the fiber direction and .042" thick were impregnated by keeping them submerged in the impregnating liquid at a temperature of 60° C. until a control sample showed that the sheets were completely impregnated, when they were dried and heated at 130° C. for 60 minutes. The sheets were measured accurately when dry and also after conditioning at 90% relative humidity at 37.8° C. Their hygroexpansivity compared with untreated sheets was as follows:

| Reaction Product in impregnating solution, Percent | Reaction Product in sheet, Percent | Expansion removed, Percent |
|---|---|---|
| 30 | 35.3 | 80 |
| 15 | 21.1 | 38 |
| 7.5 | 11.6 | 26 |

*Example 24.*—328 parts of polyethylene glycol 200 adipic acid monoester (1 mol) were reacted with 20.3 parts of monoethanolamine (⅓ mol) in the presence of 802 parts of water to produce a clear yellowish tinted solution, having a pH value of 5.1 at a temperature of 60° C.

Impregnated cellulose fiber board strips containing 12.7%, 24.6% and 37.2% of the reaction product of the example lost 33%, 60% and 80%, respectively, of their ability to contract and expand due to humidity variations in the atmosphere.

*Example 25.*—A 45% total solids water solution consisting of 66.6 parts of the monoethanolamine salt of polyethylene glycol 200 adipic acid monoester (mol for mol) and 33.4 parts of a synthetic rubber latex comprising styrene 60%-butadiene 40% and known to the trade as Latex 512 R, was used at a pH of 8.6 to impregnate cellulose fiber board sheets. An evaluation of the impregnated sheets showed improved resistance to dimensional changes under varying humidity in the atmosphere and when the sheet was brought in contact with water.

*Example 26.*—Cellulose fiber board strips were impregnated with aqueous dispersions having a pH value of 5.1 and containing 40%, 20% and 10% of total solids composed of 80% of the reaction product of 1 mol of polyethylene glycol 200 adipic acid monoester and ⅓ mol of monoethanolamine, 15% animal glue and 5% emulsified paraffin wax. The impregnated strips containing 40, 28 and 16% solids of this example lost 75, 66 and 38%, respectively, of their normal hygroexpansivity.

When the 6, 3 and 1.5%, respectively, of animal glue in the total wet weight of the above impregnating solutions were replaced with 2, 1 and 0.5%, respectively, of gelatin in the total wet weight of solution, and when cellulose fiber strips were impregnated with the solutions so formed, they then contained 35, 23 and 14% solids and lost 85, 51 and 25% of their normal hygroexpansivity.

Furthermore, all of the samples treated in accordance with the method described in this example possessed improved water-resistance and improved stiffness and were well suited for printing and writing with ink without the "feathering" effect.

*Example 27.*—Cellulose fiber board strips were impregnated with aqueous solutions of various concentrations of a composition comprising 82% of the monoethanolamine salt of ethylene glycol sebacic acid monoester, 15% animal glue, and 3% paraffin wax.

Impregnated cellulose fiber board strips of .061" thick fiber board contained 44, 36 and 23% of solids described in this example and they lost 88, 76 and 53%, respectively, of their normal hygroexpansivity.

*Example 28.*—Cellulose fiber board strips were impregnated with an aqueous dispersion having a pH value of 6.3 and containing 36% of total solids composed of 81% of the reaction product of 1 mol of ethylene glycol sebacic acid monoester and ⅔ mol of monoethanolamine, 17% animal glue and 2% synthetic wax, known by the trade name, Cyron Size.

The impregnated strips containing 46.5% solids of this example lost 87% of their normal hygroexpansivity.

*Example 29.*—Cellulose fiber sheets were impregnated with a solution composed of 107 parts of a 70% aqueous solution of phenol-formaldehyde resin, 150 parts of polyethylene glycol 200 adipic acid monoester reacted with 9.4 parts of monoethanolamine, 116 parts of isopropyl alcohol and 116 parts of water. The sheets after drying at a temperature of 108° C. for a time sufficient to set the resin showed improved dimensional stability when subjected to variation of humidity in the atmosphere as well as improved stiffness.

*Example 30.*—A 30% water solution of the reaction product of polyethylene glycol 200 adipic acid monoester (1 mol) and monoethanolamine (1 mol) was used for impregnation of cotton cloth. After drying the cloth samples contained 18% by weight of the stabilizer and lost 51% of the original expansion-contraction in the direction parallel to the hem of the bolt and 37% of the expansion-contraction perpendicular to the hem of the bolt.

The same solution was used for impregnation of rayon gabardine cloth. After drying the rayon gabardine cloth samples contained 21% by weight of the stabilizer and lost 95% of the original expansion-contraction in the direction parallel to the hem of the bolt and 62% of the expansion-contraction perpendicular to the hem of the bolt.

*Example 31.*—A 30% water solution of the reaction product of polyethylene glycol 200 adipic acid monoester (1 mol) and monoethanolamine (1 mol) was used to impregnate strips of white pine wood. After drying the wood contained 17% stabilizer.

The impregnated wood showed improvement in dimensional stability by 72% with the grain, and by 43% across the grain, and by 51% in its thickness.

*Example 32.*—A 30% water solution of the reaction product of polyethylene glycol 200 adipic acid monoester (1 mol) and monoethanolamine (1 mol) was used in the impregnation of strips of cellophane film. On drying the film contained 19.0% impregnated solids and lost 14% of its original expansion-contraction perpendicular to the direction of travel of the sheet through the machine during its formation and 20% parallel thereto.

*Example 33.*—Cellulose fiber board strips were impregnated with an aqueous solution containing 30% of the reaction product of one mol of polyethylene glycol 200 adipic acid monoester with one mol of monoisopropanolamine, the solution having a pH of 9.6. The impregnated strips after drying contained 35.0% of the stabilizer compound and they lost 78% of their normal hygroexpansivity.

*Example 34.*—Cellulose fiber board strips were impregnated with an aqueous solution containing 30% of the reaction product of one mol of polyethylene glycol 200 adipic acid monoester with one mol of N-acetyl ethanolamine, the solution having a pH of 3.7. The impregnated strips after drying contained 38.0% of the stabilizer compound and they lost 77% of their normal hygroexpansivity.

*Example 35.*—Cellulose fiber board strips were impregnated with an aqueous solution containing 30% of the reaction product of one mol of polyethylene glycol 200 adipic acid monoester with one mol of diethyl ethanolamine, the solution having a pH of 5.3. The impregnated strips after drying contained 30.0% of the stabilizer compound and they lost 65% of their normal hygroexpansivity.

*Example 36.*—Cellulose fiber board strips were impregnated with an aqueous solution containing 30% of the reaction product of one mol of polyethylene glycol 200 adipic acid monoester with one mol of phenyl ethanolamine, the solution having a pH of 4.9. The impregnated strips after drying contained 34.0% of the stabilizer compound and they lost 92% of their normal hygroexpansivity.

*Example 37.*—216 parts of 2-butene-1,4-diol adipic acid monoester (1 mol) were reacted with 61 parts of monoethanolamine (1 mol) in water and the reaction mixture diluted with additional water to obtain a 30% solution of the reaction product. The 30% solution had a pH of 9.0.

Cellulose fiber board sheets were impregnated with the above solution and after drying it was found that the sheets retained 35.6% of the reaction product and they lost 73% of their normal hygroexpansivity.

*Example 38.*—246.3 parts of ethylene glycol sebacic acid monoester (1 mol) were reacted with 45.8 parts monoethanolamine (0.75 mol) in water and the reaction mixture diluted with additional water to obtain a 30% solution of the reaction product. The 30% solution had a pH of 6.5.

Cellulose fiber board sheets were impregnated with the above solution and after drying, it was found that the sheets retained 36.7% of the reaction product and they lost 83% of their normal hygroexpansivity.

*Example 39.*—The reaction product of 328.1 parts of polyethylene glycol 200 adipic acid monoester (1 mol) and 137.1 parts of phenyl ethanolamine (1 mol) were dissolved in a solvent composed of 50% of isopropyl alcohol and 50% of water to provide a 30% solution having a pH of 4.9.

Cellulose fiber board sheets were impregnated with the above solution and after drying it was found that the sheets retained 34.0% of the reaction product and they lost 92% of their normal hygroexpansivity.

*Example 40.*—481.1 parts of propylene glycol abietic acid-maleic acid anhydride adduct monoester (1 mol) were reacted with 122.16 parts of monoethanolamine (2 mols) in water and the reaction product diluted with additional water to obtain a 30% solution of the reaction product. The 30% solution had a pH of 7.2.

Cellulose fiber board sheets were impregnated with the above solution and after drying it was found that the sheets retained 40.4% of the reaction product and they lost 53% of their normal hygroexpansivity.

*Example 41.*—481.1 parts of propylene glycol abietic acid-maleic acid anhydride adduct monoester (1 mol) were reacted with 61.08 parts of monoethanolamine (1 mol) in water and the reaction mixture diluted with additional water to obtain a 30% solution of the reaction product. The 30% solution had a pH of 6.3.

Cellulose fiber board sheets were impregnated with the above solution and after drying it was found that the sheets retained 41.5% of the reaction product and they lost 70% of their normal hygroexpansivity.

*Example 42.*—A mixed diacid ester was prepared by heating for 90 minutes at 165–180° C. 1 mol of polyethylene glycol 200, 1 mol of maleic acid anhydride, 1 mol of adipic acid. The diacid ester was then reacted with 1 mol of monoethanol amine in water. The ethanolamine salt of the diacid ester so formed was diluted with additional water to obtain a 30% solution having a pH of 4.5.

Cellulose fiber board sheets were impregnated with the above solution and after drying it was found that the sheets retained 39.3% of the reaction product and they lost 85% of their normal hygroexpansivity.

*Example 43.*—The diacid ester of Example 42 was reacted with 2 mols of monoethanolamine in water. The ethanolamine salt of the diacid ester so formed was diluted with additional water to obtain a 30% solution having a pH of 6.5.

Cellulose fiber board sheets were impregnated with the above solution and after drying it was found that the sheets retained 38.2% of the reaction product and they lost 81% of their normal hygroexpansivity.

*Example 44.*—A mixture of 1 mol of dipropylene glycol abietic acid-maleic acid anhydride adduct monoester and 1 mol of dipropylene glycol adipic acid monoester was reacted with 3 mols of monoethanolamine in water. The reaction mixture was diluted to provide a solution having a total solids content of 30% and a pH of 9.2.

Cellulose fiber board sheets were impregnated with the above solution and after drying it was found that the sheets retained 36.1% of the reaction product and they lost 87% of their normal hygroexpansivity.

*Example 45.*—There was prepared a series of 30% water solutions of polyethylene glycol 200 adipic acid monoester and amounts of monoethanolamine varying from 0 to 1 mol. The effect of monoethanolamine addition on the pH of the solutions is shown by the following table.

| Solution No. | Parts of Monoester | Parts of monoethanolamine | pH of 30% water solution |
|---|---|---|---|
| 1 | 328 | none | 2.8 |
| 2 | 328 | 10.2 | 4.5 |
| 3 | 328 | 20.4 | 4.9 |
| 4 | 328 | 30.5 | 5.2 |
| 5 | 328 | 45.8 | 5.6 |
| 6 | 328 | 53.4 | 6.0 |
| 7 | 328 | 59.1 | 6.7 |
| 8 | 328 | 61.1 | 7.0 |

Fiber board strips were impregnated with each of the above solutions and after drying each strip was found to be effectively stabilized against expansion and contraction on being subjected to humidity variations in the atmosphere.

*Example 46.*—200 parts of polyethylene glycol 200 (1 mol) were mixed with 146 parts of adipic acid (1 mol) and 98 parts of maleic anhydride (1 mol). The mixture was stirred and heated at 165–180° C. for 90 minutes, after which the titration of a sample indicated the formation of the mixed partial ester was completed.

426 parts of this above mentioned polyethylene glycol 200 maleic acid-adipic acid diester (1 mol) and 122.16 parts of monoethanolamine (2 mols) were reacted in 1,273 parts of water. This reaction was exothermic and produced a yellow tinted, clear solution at a temperature of 60° C. Its pH was 6.4. The reaction product thus produced was used without further dilution in water for impregnating cellulose sheets (17″ x 22″ basis 500 sheets—27 lbs.) prepared on a Fourdrinier machine from beater sized 100% bleached sulfite fiber stock. The impregnation of the sheets was carried out by keeping them submerged in the impregnating solution at a temperature of 60° C. for 10 seconds, followed by squeezing thru a wringer roll nip. This procedure was repeated three times before the impregnated sheets were oven dried at 130° C. for 30 minutes. The sheets were measured accurately when dry, and also after conditioning, at 90% relative humidity at 37.8° C. All of the impregnated sheets showed improved dimensional stability under varying humidity in the atmosphere.

*Example 47.*—62 parts of ethylene glycol and 202 parts of sebacic acid were stirred and heated at 155° C.

for 30 minutes, after which the titration of a sample indicated that the formation of the monoester was completed.

246 parts of ethylene glycol sebacic acid monoester (1 mol) thus obtained was reacted with 61.08 parts of monoethanolamine (1 mol) in 715 parts of water to provide a 30% solution of the reaction product. This reaction was exothermic and produced a yellow tinted, clear solution at a temperature of 60° C. Its pH was 8.1. The reaction product thus produced was used without further dilution in water and diluted so as to provide 15% and 7.5% solutions for impregnating cellulose sheets prepared on a Fourdrinier machine (19" x 16.31"—500 sheets—17.93#) from 50% bleached linen and 50% bleached cotton rag fibers. The cellulose sheets used in this example contained no size, no alum and no melamine resin. The impregnation of the sheets was carried out by keeping them submerged in the impregnating liquid at a temperature of 60° C. for 2 seconds followed by squeezing through a wringer roll nip. This procedure was repeated twice before the impregnated sheets were oven dried at 130° C. for 30 minutes. The sheets were measured accurately when dry and also after conditioning at 90% relative humidity at 37.8° C. Their hygroexpansivity compared with that of untreated sheets was as follows:

| Reaction Product in impregnating solution, Percent | Reaction Product in sheet, Percent | Expansion removed, Percent |
|---|---|---|
| 30.0 | 18.0 | 75 |
| 15.0 | 13.7 | 36 |
| 7.5 | 8.8 | 26 |

*Example 48.*—The 30% and 15% solutions of Example 47 were used for impregnating cellulose sheets prepared on a Fourdrinier machine (17" x 22"—basis 500 sheets 24 lbs.) from 100% (kraft) sulfate fibers, sized with 3% melamine-formaldehyde resin, which was added at the headbox. The sheets were impregnated by keeping them submerged in the impregnating solution at a temperature of 60° C. for 2 seconds followed by squeezing through a wringer roll nip. This procedure was repeated twice before the impregnated sheets were oven dried at 130° C. for 30 minutes. The sheets were measured accurately when dry, and also after conditioning, at 90% relative humidity at 37.8° C. Their hygroexpansivity compared with that of the untreated sheets was as follows:

| Reaction Product in impregnating solution, Percent | Reaction Product in sheet, Percent | Expansion removed, Percent |
|---|---|---|
| 30 | 20.3 | 70 |
| 15 | 14.7 | 47 |

*Example 49.*—The 30%, 15% and 7.5% solutions of Example 47 were used for impregnating cellulose sheets (17" x 22", basis 500 sheets—27 lbs.) prepared on a Fourdrinier machine from 100% sulfite fiber stock sized with a small amount of melamine-formaldehyde resin added at the headbox of the machine. These sulfite sheets used in the impregnation had dimensions of 12" across the fiber direction, 2" in the fiber direction and .005" thick. The impregnation of the sheets was carried out by keeping them submerged in the impregnating liquid at a temperature of 60° C. for 2 seconds followed by squeezing through a wringer roll nip. This procedure was repeated twice before the impregnated sheets were oven dried at 130° C. for 30 minutes. The sheets were measured accurately when dry, and also after conditioning, at 90% relative humidity at 37.8° C. Their hygroexpansivity compared with untreated sheets was as follows:

| Reaction Product in impregnating solution, Percent | Reaction Product in sheet, Percent | Expansion removed, Percent |
|---|---|---|
| 30.0 | 24.4 | 72 |
| 15.0 | 16.8 | 67 |
| 7.5 | 12.6 | 38 |

*Example 50.*—Cellulose fiber board strips were impregnated with an aqueous solution having a pH of 5.05 and containing 37.5% total solids composed of 50 parts of the reaction product of one mol of adipic acid and one mol of monoethanolamine and 50 parts of a water-soluble urea-formaldehyde resin.

The impregnated strips containing quantities of the above solids varying in concentration from 16% to 44% showed improvement in dimensional stability when subjected to variations of relative humidity in the atmosphere ranging from 0–90%.

*Example 51.*—Cellulose fiber board strips were impregnated with an aqueous solution having a pH value of 4.8 and containing 30% total solids composed of 82 parts of the reaction product of one mol of adipic acid and one mol of monoethanolamine, 12 parts animal glue and 3 parts finely dispersed petroleum wax.

The dried impregnated strips containing 36.6% and 23.6% solids of this example showed improvement in dimensional stability when subjected to an atmosphere of varying relative humidity.

*Example 52.*—Cellulose fiber board strips were impregnated with an aqueous solution having a pH value of 8.7 and containing 27.5% solids composed of 90 parts of the reaction product of equimolecular portions of monoisopropanolamine and polyethylene glycol 200-adipic acid monoester and 10 parts of a melamine-formaldehyde resin.

The dried impregnated strips containing 11.4% and 39.5% by weight of the solids of this example showed a loss in hygroexpansivity of 24.4% to 70.0%, respectively, when subjected to atmosphere variations of 0% to 90% relative humidity.

*Example 53.*—Strips made from 50% cotton and 50% linen fiber were impregnated with an aqueous solution having a pH value of 8.4 and containing 30.3% solids composed of 87.2 parts of the reaction product of equimolecular portions of diethylene glycol phthalic acid monoester and monoethanolamine and 12.8 parts of melamine-formaldehyde resin.

The dried impregnated strips containing 14.4 and 23.9% by weight of the solids of this example showed improvement in dimensional stability when exposed to atmosphere variation of 0% to 90% relative humidity.

*Example 54.*—Bleached, unsized sulfate paper strips were impregnated with solution in 50% of isopropanol and 50% of water of 30% solids composed of 80 parts of the product obtained by reacting equimolecular portions of phenyl ethyl ethanolamine and 1,2,4-butanetriol diadipate and 20 parts of a urea-formaldehyde resin. The pH of this clear solution was 4.9.

The dried impregnated strips containing 18.7 and 29.7% by weight of the solids of this example showed an improvement in dimensional stability of 33.1% and 53.2%, respectively, when exposed to atmospheric variations of 0% to 90% relative humidity.

*Example 55.*—Cellulose fiber strips composed of 100% sulfite paper were impregnated with an aqueous solution having a pH value of 9.6 and containing 22.2% solids composed of 90 parts of the product obtained by reacting equimolecular quantities of 2-amino-2-methyl-1-propanol and 2-ethylhexanediol-1,3-phthalic acid monoester, 5 parts of gelatin and 5 parts of finely dispersed petroleum wax.

The dried impregnated strips containing 10.1 and 17.5% by weight of the solids of this example showed improvement in dimensional stability when exposed to an atmosphere varying in relative humidity from 0 to 90%.

Samples of the dimensionally stabilized cellulose strips of this example were coated with an aqueous dispersion of animal glue. Similar samples of unstabilized cellulose strips were also coated with an aqueous dispersion of animal glue. An improvement in the resistance to cupping and curling was noted in the dimensionally stabilized samples.

*Example 56.*—Cotton cloth strips 2" x 18", one of which was cut parallel and the other of which was cut perpendicular to the hem, were impregnated at 50° C. in an aqueous solution having a pH value of 8.7 and containing 27.5% solids composed of 90 parts of the reaction product of equimolecular quantities of monoisopropylamine and polyethylene glycol 200-adipic acid monoester and 10 parts of a melamine-formaldehyde resin.

The dried impregnated strips containing 10.3% of the solids of this example in the strip cut perpendicular to the hem and 28.7% in the strip cut parallel to the hem showed a loss in hygroexpansivity of 83.5% and 75.2%, respectively, when subjected to changes of the relative humidity in the atmosphere varying between 0 and 90%.

*Example 57.*—Two cellulose fiber board strips were impregnated with an aqueous solution having a pH value of 3.6 containing 27.8% total solids composed of 90 parts of the reaction product of 1 mol of fumaric acid and 1 mol of N,N-dibutyl isopropanolamine, 5 parts gelatin, and 5 parts finely dispersed petroleum wax.

The dried impregnated strips containing 14.4% and 30.9% of the above solids lost 29.8% and 64.9%, respectively, of their normal hydroexpansivity when they were exposed to an atmosphere of varying humidity.

*Example 58.*—Cellulose fiber board strips were impregnated with an aqueous solution having a pH value of 6.8 and containing 31.2% total solids composed of 80 parts of the reaction product of two mols of α-methyl benzyl monoethanolamine and 1 mol 1,4-butanediol diadipate, 15 parts of animal glue and 5 parts of finely dispersed petroleum wax.

The dried impregnated strips containing 23.6% and 24.1% of the solids of this example lost 48.3 and 52.3% of their normal hygroexpansivity when subjected to atmosphere variations of 0–90% relative humidity.

Samples of the dimensionally stabilized cellulose strips of this example were coated with an aqueous dispersion of gelatin. Similar samples of unstabilized cellulose strips were also coated with an aqueous dispersion of gelatin. An improvement in the resistance to cupping and curling was noted in the dimensionally stabilized samples.

*Example 59.*—Cellulose fiber board strips were impregnated with an aqueous solution having a pH value of 7.2 and containing 38.5% total solids composed of 65 parts of the reaction product of 2 mols of monoethanolamine and 1 mol of azelaic acid, 25 parts of melamine-formaldehyde resin, 7 parts of animal glue and 3 parts of a finely dispersed petroleum wax.

The dried impregnated strips containing 41.5% and 23.4% of the solids of this example lost 57.5% and 16.1% of their normal hygroexpansivity when subjected to atmosphere variations of 0% to 90% relative humidity.

*Example 60.*—Cellulose fiber board strips were impregnated with a solution having a pH value of 3.6 and containing 38.6% total solids composed of 65 parts of the reaction product of equimolecular quantities of 2-amino-2-methyl-1-propanol and diethylene glycol dimaleate, 25 parts of a urea-formaldehyde resin, 6 parts of animal glue and 4 parts of a finely dispersed petroleum wax.

The dried impregnated strips containing quantities of the solids of this example varying from 13.3% to 33.9% showed improvement in dimensional stability when exposed to atmosphere changes of 0% to 90% relative humidity.

*Example 61.*—A 25% aqueous solution of monoethanolamine acid salt of isosebacic acid was prepared by dissolving 30.6 g. (0.5 mol) of monoethanolamine in 395.0 g. of water and adding 101.1 g. (0.5 mol) of isosebacic acid. This mixture was stirred and heated to 50° C. at which temperature complete solution took place. The clear colorless solution having a pH value of 5.6 was used to impregnate 8" x 10½" exposed and developed photographic prints. The impregnations were carried out in a flat dish at 50° C. to 55° C. for 5 minutes, 1 minute, and 30 seconds. In each case the usual tendency of untreated prints to "curl" and "cockle" when exposed to elevated temperatures and low humidities was essentially eliminated in the treated prints. The treated prints also showed improved dimensional stability when wetted with water.

Isosebacic acid used in this example is the trade name of a commercial product which is a mixture of C–10 aliphatic dicarboxylic acids of the following composition: 72–80% of α ethyl suberic acid, 12–18% of α,α'-diethyl adipic acid and 6–10% of sebacic acid.

*Example 62.*—150 grams of polyethylene glycol adipic acid monoester was reacted with 4.7 grams of monoethanolamine and finally heated to 65° C. to get a clear solution. This gave a reaction ratio of 1 mol of the monoester to 0.166 mol of the monoethanolamine. While stirring and heating the reaction product 398 grams of water, 10 grams of gelatine and 20 grams of wax sizing emulsion were added. The resulting solution containing wax in suspension had the following composition: 30% monoethanolamine salt of polyethylene glycol adipic acid monoester, 2% gelatine, and 2% wax. This solution having a pH value of 4.3 was used for impregnation of white photographic base paper (basis 104 grams per square meter). The solids picked up by the paper, depending upon the length of time of impregnation, ranging from 15 to 45 seconds, was 14, 20 and 24%, which resulted in the decrease of normal hygroexpansivity by 25%, 64% and 77%, respectively. The dimensionally stabilized photographic base papers showed marked improvement in resisting their tendency toward curling and cockling when wetted or where exposed to changes of relative humidity in the atmosphere.

B. DIALKANOL AMINES

*Example 63.*—146 parts of adipic acid (1 mol) and 105 parts of diethanolamine (1 mol) were stirred with 586 parts of water until the exothermic reaction ceased. The resulting solution was clear and colorless at 50° C. The pH of this solution was 4.9.

Cellulose fiber board strips impregnated with 15% and 30% aqueous solution of the acid salt of this example contained 23.1% and 36.5% of the above reaction product and lost 30% and 79%, respectively, of their ability to contract and expand due to humidity variation in the atmosphere.

*Example 64.*—188.2 parts of azelaic acid (1 mol) and 105 parts of diethanolamine (1 mol) were reacted in 683 parts of water to produce a diethanolamine acid salt solution of azelaic acid. The clear red colored solution having a pH of 5.6 was kept at a temperature of 65° C. and used in the impregnation of cellulose fiber strips prepared from news stock.

The impregnated cellulose fiber board strips containing 15%, 24.3% and 36.9% of the acid salt of this example lost 13%, 38% and 84%, respectively, of their ability to contract and expand due to humidity variation in the atmosphere.

*Example 65.*—90 parts of lactic acid (1 mol) and 52.7 parts of diethanolamine (½ mol) were heated in 332 parts of water to obtain a clear colorless solution, the pH of which was 4.1.

Impregnated cellulose fiber board strips containing 22.4% and 35.1% of the reaction product of this example lost 42% and 86%, respectively, of their original ability to contract and expand with variation of relative humidity in the atmosphere.

*Example 66.*—Cellulose fiber board strips were impregnated with an aqueous solution containing 30% of the reaction product of one mol of polyethylene glycol 200 adipic acid monoester with one mol of diethanolamine, the solution having a pH of 7.0. The impregnated strips after drying contained 35.0% of the stabilizer compound and they lost 79% of their normal hygroexpansivity.

*Example 67.*—Cellulose fiber board strips were impregnated with an aqueous solution containing 30% of the reaction product of one mol of polyethylene glycol 200 adipic acid monoester with one-third mol of diethanolamine, the solution having a pH of 6.0. The impregnated strips after drying contained 37.0% of the stabilizer compound and they lost 74% of their normal hygroexpansivity.

*Example 68.*—Cellulose fiber board strips were impregnated with an aqueous solution containing 30% of the reaction product of one mol of polyethylene glycol 200 adipic acid monoester with one mol of N-methyl diethanolamine, the solution having a pH of 8.1. The impregnated strips after drying contained 35.0% of the stabilizer compound and they lost 84% of their normal hygroexpansivity.

*Example 69.*—294.3 parts of glyceryl-sebacic acid monoester (1 mol) were reacted with 105.2 parts of diethanolamine (1 mol) in water and the reaction mixture diluted with additional water to obtain a 30% solution of the reaction product. The 30% solution had a pH of 7.0.

Cellulose fiber board sheets were impregnated with the above solution and after drying it was found that the sheets retained 41.0% of the reaction product and they lost 85% of their normal hygroexpansivity.

*Example 70.*—The reaction product of 215.6 parts of propylene glycol adipic acid monoester (1 mol) and 105.2 parts of diethanolamine (1 mol) were dissolved in a solvent composed of 50% isopropyl alcohol and 50% of water to provide a 30% solution having a pH of 7.0.

Cellulose fiber board sheets were impregnated with the above solution and after drying it was found that the sheets retained 38.7% of the reaction product and they lost 81% of their normal hygroexpansivity.

*Example 71.*—The reaction product of 476.5 parts of mono 1,4-butane-diol disebacate (1 mol) and 105.2 parts of diethanolamine (1 mol) were dissolved in a solvent composed of 50% isopropyl alcohol and 50% of water to provide a 30% solution having a pH of 6.0.

Cellulose fiber board sheets were impregnated with the above solution and after drying it was found that the sheets retained 42.4% of the reaction product and they lost 67% of their normal hygroexpansivity.

*Example 72.*—282.0 parts of diethylene glycol azelaic acid monoester (1 mol) were reacted with 105.2 parts of diethanolamine (1 mol) in water and the reaction mixture diluted with additional water to obtain a 30% solution of the reaction product. The 30% solution had a pH of 7.2.

Cellulose fiber board sheets were impregnated with the above solution and after drying it was found that the sheets retained 38.6% of the reaction product and they lost 82% of their normal hygroexpansivity.

*Example 73.*—246.3 parts of ethylene glycol sebacic acid monoester (1 mol) were reacted with 133.2 parts of diisopropanolamine (1 mol) in water and the reaction mixture diluted with additional water to obtain a 30% solution of the reaction product. The 30% solution had a pH of 7.2.

Cellulose fiber sheets were impregnated with the above solution and after drying it was found that the sheets retained 36.1% of the reaction product and they lost 84% of their normal hygroexpansivity.

*Example 74.*—358.0 parts of ethylene glycol diphthalate (1 mol) were reacted with 105.2 parts of diethanolamine (1 mol) in water and the reaction mixture diluted with additional water to obtain a 30% solution of the reaction product. The 30% solution had a pH of 4.0.

Cellulose fiber sheets were impregnated with the above solution and after drying it was found that the sheets retained 36.4% of the reaction product and they lost 71% of their normal hygroexpansivity.

*Example 75.*—Cellulose fiber board strips were impregnated with an aqueous solution having a pH value of 5.3 containing 30% total solids composed of 70 parts of the reaction product of one mol of diethanolamine and one mol of lactic acid and 30 parts of a urea-formaldehyde resin.

The dried impregnated strips containing quantities of the above solids varying in concentration from 22.4% to 37.1% showed improvement in dimensional stability when subjected to variations of relative humidity in the atmosphere ranging from 0–90%.

*Example 76.*—Cellulose fiber board strips were impregnated with an aqueous solution having a pH of 3.8 and containing 31.2% total solids composed of 80 parts of the salt obtained by reacting equimolecular quantities of malic acid and diethanolamine, 15 parts of animal glue and 5 parts of finely dispersed petroleum wax.

The impregnated strips containing 39.4% and 24.3% of the solids of this example showed improvement in dimensional stability when subjected to an atmosphere of varying humidity.

*Example 77.*—Cellulose fiber board strips were impregnated with an aqueous solution having a pH value of 7.7 and containing 30% total solids composed of 80 parts of the reaction product of 1 mol of diethanolamine with 1 mol of o-salicylic acid and 20 parts of a melamine-formaldehyde resin.

The dried impregnated strips containing 48.0 and 27.1% of the solids of this example lost 65.5 and 54.3%, respectively, of their normal hygroexpansivity when they were exposed to an atmosphere of varying humidity.

*Example 78.*—Cellulose fiber board strips were impregnated with an aqueous solution having a pH value of 7.3 and containing 31.3% total solids composed of 80 parts of the reaction product of one mol of gallic acid and one mol of diethanolamine, 15 parts animal glue and 5 parts of finely dispersed petroleum wax.

The dried impregnated strips containing 25.4% to 38.7% of the reaction product of this example showed improvement in dimensional stability when subjected to atmosphere variations of 0% to 90% relative humidity.

*Example 79.*—Rayon gabardine strips 2″ x 18″ one of which was cut parallel and the other of which was cut perpendicular to the hem were impregnated with an aqueous solution having a pH value of 7.7 and containing 30% total solids composed of 80 parts of the reaction product of one mol of diethanolamine and one mol of o-salicylic acid and 20 parts of a melamine-formaldehyde resin.

The dried impregnated strips each containing 21% by weight of the solids of this example showed a loss in hygroexpansivity of 82.6% for the strip cut parallel to the hem and 70% for the strip cut perpendicular to the hem when subjected to changes in the relative humidity in the atmosphere varying between 0 and 90%.

*Example 80.*—Cellulose fiber board strips were impregnated with an aqueous solution having a pH value of 8.7 and containing 35.7% total solids composed of 70 parts of the reaction product of 1½ mols of diethanolamine and 1 mol of salicylic acid, 20 parts of a melamine-formaldehyde resin, 5 parts animal glue, and 5 parts of a finely dispersed petroleum wax.

The dried impregnated strips containing 41.5% and 24.8% of the solids of this example lost 44.8% and 25.3%, respectively, of their normal hygroexpansivity when subjected to atmosphere variations of 0% to 90% relative humidity.

Example 81.—A 25% aqueous solution of diethanolamine salt of ethylene glycol sebacic acid monoester was prepared by dissolving 52.6 parts (0.5 mols) of diethanolamine in 527.1 parts of water, and adding 123.1 parts (0.5 mols) of ethylene glycol sebacic monoester. The mixture was stirred and heated to 65° C., at which temperature complete solution took place. The clear solution having a pH value of 7.5 was used to impregnate 8″ x 10½″ exposed and developed photographic prints. Impregnations were carried out in a flat dish at 55° C. to 65° C. for 5 minutes, 1 minute, and 30 seconds. In each case the usual tendency of untreated prints to "curl" and "cockle" when exposed to elevate temperatures and low humidities was essentially eliminated in the treated prints. The treated prints also showed improved dimensional stability when wetted with water.

C. TRIALKANOLAMINES

Example 82.—146 parts of adipic acid (1 mol) and 149.2 parts of triethanolamine (1 mol) were stirred with 687 parts of water until the exothermic reaction had come to an end. The resulting red colored solution was clear at 50–60° C. The hygroexpansivity of impregnated fiber board strips containing 23.7% and 37.5% of the acid salt of this example was reduced by 21% and 78%, respectively.

Example 83.—188.2 parts of azelaic acid (1 mol) and 149.2 parts of triethanolamine (1 mol) were reacted with 784 parts of water. After the resulting exothermic reaction subsided a clear red colored solution at 60° C. was obtained. Its pH was 5.6.

The contraction and expansion of cellulose fiber board strips impregnated with 7.5%, 15% and 30% solution of the reaction product of this example containing 16.1%, 25.9% and 39.1% of the dimensional stabilizer of this example lost 20%, 39% and 85%, respectively, of normal contraction and expansion occurring under varying conditions of humidity in the atmosphere.

Example 84.—384 parts of anhydrous citric acid (2 mols) and 191.3 parts triisopropanolamine (1 mol) were reacted in 1,344 parts of water with a slightly exothermic effect. At 40° C. a clear reddish brown solution was obtained with a pH of 2.9.

Impregnated cellulose fiber board strips containing 14.2%, 24.5% and 39.0% of the reaction product of this example lost 27%, 42% and 83%, respectively, of their ability to contract and expand when subjected to humidity variations in the atmosphere.

Example 85.—Cellulose fiber board strips were impregnated with an aqueous solution containing 30% of the reaction product of one mol of polyethylene glycol 200 adipic acid monoester with one mol of triethanolamine, the solution having a pH of 7.0. The impregnated strips after drying contained 37.0% of the stabilizer compound and they lost 81% of their normal hygroexpansivity.

Example 86.—Cellulose fiber board strips were impregnated with an aqueous solution containing 30% of the reaction product of one mol of polyethylene glycol 200 adipic acid monoester with ⅓ mol of triethanolamine, the solution having a pH of 6.0. The impregnated strips after drying contained 37.0% of the stabilizer compound and they lost 87% of their normal hygroexpansivity.

Example 87.—386.3 parts didiethylene glycol monocitrate (1 mol) were reacted with 74.5 parts of triethanolamine (0.5 mol) in water and the reaction mixture diluted with additional water to obtain a 30% solution of the reaction product. The 30% solution had a pH of 4.0.

Cellulose fiber board sheets were impregnated with the above solution and after drying it was found that the sheets retained 31.8% of the reaction product and they lost 67% of their normal hygroexpansivity.

Example 88.—460.3 parts of mono propylene glycol dicitrate (1 mol) and 298.3 parts of triethanolamine (2 mols) were reacted in water and the reaction mixture diluted with additional water to obtain a 30% solution of the reaction product. The 30% solution had a pH of 4.0.

Cellulose fiber board sheets were impregnated with the above solution and after drying it was found that the sheets retained 37.0% of the reaction product and they lost 76% of their normal hygroexpansivity.

Example 89.—Cellulose fiber board strips were impregnated with an aqueous solution having a pH value of 4.3 containing 35% total solids composed of 60 parts of the reaction product of equimolecular quantities of phthalic anhydride and triethanolamine and 40 parts of a urea-formaldehyde resin.

The dried impregnated strips containing 44.5% and 26.7% of the solids of this example lost 60.2% and 19.1%, respectively, of their normal hygroexpansivity when they were subjected to variations of relative humidity in the atmosphere ranging from 0–90%.

Example 90.—Cellulose fiber board strips were impregnated with an aqueous solution having a pH value of 7.5 and containing 44.5% total solids composed of 92 parts of the reaction product of 3 mols of triethanolamine and 1 mol of the adduct of abietic acid and maleic anhydride, 5.6 parts of animal glue and 2.4 parts of finely dispersed petroleum wax.

The dried impregnated strips containing 50.7% and 52.1% of the solids of this example lost 74.3% and 70.0%, respectively, of their normal hygroexpansivity when they were subjected to variations of relative humidity in the atmosphere ranging from 0–90%.

II. Reaction products with heterocyclic organic nitrogen compounds having a hydroxyl group attached to a carbon atom in the molecule Example 91.—Cellulose fiber board strips were impregnated with an aqueous solution containing 30% of the reaction product of 1 mol of polyethylene glycol 200 adipic acid monoester with ⅓ mol of N-hydroxyethyl morpholine, the solution having a pH of 4.9. The impregnated strips after drying contained 38.0% of the stabilizer compound and they lost 85% of their normal hygroexpansivity.

Example 92.—Cellulose fiber board strips were impregnated with an aqueous solution containing 30% of the reaction product of 1 mol of polyethylene glycol 200 adipic acid monoester with ⅓ mol of a glyoxalidine, having the trade name Amine 220 and the formula

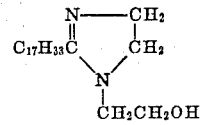

the solution having a pH of 5.0. The impregnated strips after drying contained 36.0% of the stabilizer compound and they lost 84% of their normal hygroexpansivity.

Example 93.—Cellulose fiber board strips were impregnated with a solution having a pH value of 4.05 and containing 25.4% of the reaction product of 0.351 mols of adipic acid and 0.259 mols of 8-quinolinol.

The dried impregnated strips containing 24.2% and 23.9% by weight of the solids of this example lost 57.2% and 54.3% of their normal hygroexpansivity when exposed to atmosphere changes of 0% to 90% relative humidity.

III. Reaction products with alkanol substituted polyamines

Example 94.—146 parts of adipic acid (1 mol) and 292 parts of N,N,N′,N′-tetrakis (2-hydroxypropyl) ethylenediamine, known by the trade name "Quadrol," (1 mol) were stirred with 1,022 parts of water until the exothermic reaction ceased. The resulting solution was clear and colorless at 50° C. The pH of this solution was 5.1.

Cellulose fiber board strips impregnated with 15% and 30% aqueous solution of the acid salt of this example contained 14.4% and 18.4% of the above reaction product and lost 40.0% and 83.2%, respectively, of their ability to contract and expand due to humidity variations in the atmosphere.

*Example 95.*—Cellulose fiber board strips containing no size were impregnated with a water solution having a pH value of 7.5 and containing 30%, 15% and 7.5% of total solids composed of the reaction product of 1 mol of ethylene glycol sebacic acid mono ester and 1 mol of N,N,N',N'-tetrakis (2-hydroxypropyl) ethylenediamine. The impregnated strips containing 39.0, 25.6 and 15.9% solids of this example lost 83.8, 49.5 and 29.2%, respectively, of their normal hygroexpansivity.

*Example 96.*—Cellulose fiber board strips containing no size were impregnated with a water solution having a pH value of 7.3 and containing 30%, 15% and 7.5% of total solids composed of the reaction product of 1 mol of polyethylene glycol adipic acid monoester and 1 mol of N,N,N',N'-tetrakis (2-hydroxypropyl) ethylenediamine. The impregnated strips containing 38.5, 23.5 and 13.5% solids of this example lost 85.2, 58.9 and 33.5%, respectively, of their normal hygroexpansivity.

*Example 97.*—Cellulose fiber board strips were impregnated with an aqueous solution having a pH value of 8.1 and containing 30% total solids composed of 83.3 parts of the reaction product of two mols of 2-(2-aminoethylamine)-ethanol and one mol of ortho phthalic acid, 8.35 parts of animal glue and 8.35 parts of finely dispersed petroleum wax.

The dried impregnated samples containing quantities of the solids of this example varying in concentration from 18.0% to 31.2% showed improvement in dimensional stability when subjected to variations of relative humidity in the atmosphere from 0–90%.

*Example 98.*—188.2 parts of azelaic acid (1 mol) and 104.2 parts of aminoethyl ethanolamine (1 mol) were reacted in 684 parts of water until the accompanying exothermic reaction subsided. The resulting clear amber colored solution at 65° C. had a pH of 6.3.

Impregnated cellulose fiber board strips containing 14.6%, 24.6% and 37.4% of the reaction product of this example lost 21%, 49% and 87%, respectively, of their ability to contract and expand when exposed to humidity variation in the atmosphere.

IV. *Reaction products with alkanol substituted ammonium hydroxide*

*Example 99.*—Cellulose fiber board strips were impregnated with an aqueous solution containing 30% of the reaction product of one mol of polyethylene glycol 200 adipic acid monoester with one-eighth mol of tetraethanol ammonium hydroxide, the solution having a pH of 8.8. The impregnated strips after drying contained 38.0% of the stabilizer compound and they lost 84% of their normal hygroexpansivity.

V. *Reaction products with amino glycols*

*Example 100.*—Cellulose fiber board strips were impregnated with an aqueous solution having a pH value of 4.6 containing 35.7% total solids composed of 70 parts of the reaction product of equimolecular quantities of maleic anhydride and 2-amino-2-(hydroxymethyl)-1,3-propanediol and 30 parts of a urea-formaldehyde resin.

The dried impregnated strips containing quantities of the above solids varying in concentration from 17.6% to 42.2% showed improvement in dimensional stability when subjected to variations of relative humidity in the atmosphere ranging from 0–90%.

*Example 101.*—Cellulose fiber board strips were impregnated with an aqueous solution having a pH value of 7.9 and containing 30% total solids composed of 80 parts of the reaction product of 1¼ mols of 2-amino-2-ethyl-1,3-propanediol and 1 mol of the monoester of ethylene glycol and azelaic acid, 10 parts of a melamine-formaldehyde resin, 5 parts of animal glue and 5 parts of a finely dispersed petroleum wax.

The dried impregnated strips containing 34.7%, 20.0% and 10.6% by weight of the solids of this example lost 67.7%, 35.0% and 17.4% of their normal hygroexpansivity when subjected to atmosphere variations of 0% to 90% relative humidity.

VI. *Reaction products with aminoaryl substituted aliphatic alcohols*

*Example 102.*—188 parts of azelaic acid (1 mol) and 137 parts of p-aminophenylethyl alcohol (1 mol) were reacted in 488 parts of water and 488 parts of isopropyl alcohol. At 50° C. a clear reddish color solution resulted with a pH of 5.1.

Impregnated cellulose fiber board strips containing 17.5, 22.4 and 31.3% of the reaction product of this example lost 50, 71 and 87%, respectively, of their ability to contract and expand when subjected to humidity variations in the atmosphere.

*Example 103.*—246 parts of ethylene glycol sebacic acid monoester (1 mol) and 137.2 parts of p-aminophenylethyl alcohol (1 mol) were reacted in 578 parts of water and 578 parts of isopropyl alcohol. At 60° C. a clear reddish colored solution resulted with a pH of 5.5.

Impregnated cellulose fiber board strips containing 26.0, 32.3 and 35.9% of the reaction product of this example lost 83, 92 and 92% respectively, of their ability to contract and expand when subjected to humidity variations in the atmosphere.

VII. *Reaction products with amino phenols*

*Example 104.*—192 parts of anhydrous citric acid (1 mol) and 145.6 parts of p-aminophenol (1 mol) were reacted in 505 parts of water and 505 parts of isopropyl alcohol. At 50° C. a clear brownish colored solution resulted with a pH of 4.5.

Impregnated cellulose fiber board strips containing 16.7, 22.7 and 32.4% of the reaction product of this example lost 32, 38 and 45%, respectively, of their ability to contract and expand when subjected to humidity variations in the atmosphere.

*Example 105.*—328 parts of polyethylene glycol 200 adipic acid monoester (1 mol) and 145.6 parts of p-aminophenol (1 mol) were reacted in 710 parts of water and 710 parts of isopropyl alcohol. At 50° C. a clear reddish colored solution resulted with a pH of 5.7.

Impregnated cellulose fiber board strips containing 15.1, 23.5 and 32.2% of the reaction product of this example lost 40, 62, and 80.5%, respectively, of their ability to contract and expand when subjected to humidity variations in the atmosphere.

In the above examples when fiber board is mentioned, it will be understood that this terminology is employed to designate a single ply sheet having a thickness usually between .030 and .065 inch and formed of cellulose pulp fiber either on a cylinder or Fourdrinier machine.

Thus, I have disclosed an economical and safe process for dimensionally stabilizing cellulose materials, novel cellulose products stabilized thereby and novel compositions of matter for use in the process. While the stabilization of cellulose materials has heretofore been mentioned with respect to expansion and contraction of material on being subjected to varying humidity in the atmosphere, it should be stressed that a high degree of stabilization is also effected upon subjection of the cellulose material to moisture to moisture in liquid form. Cellulose sheet materials which, after being wet with water would ordinarily cup and curl, show little tendency in this direction if they have previously been treated with my dimensional stabilizers.

Photographic prints and papers are a type of article in which this cupping and curling is particularly pronounced either when wet with water or subjected to humidity variations in the atmosphere. This is believed due to the fact that there is a differential in the rate and the degree of drying between the side of the paper that is emulsion coated and that which is uncoated. It has already been pointed out that the stabilizers of the present invention are particularly suitable for use with photographic papers since they are readily adjusted to an acidity which will not affect the light sensitive emulsion coating.

The anti-curling effect of the present stabilizers may be realized with respect to photographic papers either by treating the base paper sheet before the light sensitive emulsion is applied or by treating the photographic print itself after it has been fully developed and washed. With respect to the last procedure, it is not necessary to dry the print before immersing it in a solution containing the stabilizing agent, as even when wet, a thorough impregnation of the cellulose base occurs. Illustrations of both types of treatment of photographic papers were included in the examples set forth above.

In the treatment of photographic papers, by impregnating the base sheet prior to emulsion coating, only saturated stabilizing compounds should be employed, since it has been found that unsaturated compounds will radically alter the speed of the light sensitive emulsion. In fact, all of the basic organic nitrogen compound reaction products of the present invention have a tendency to increase the speed of the light sensitive emulsion. However, this can be compensated for in the emulsion, itself, or, preferably, a thin barrier layer may be placed between the base paper and the photographic emulsion. This barrier layer may be of any suitable material which will prevent the stabilizer in the base sheet from contacting and affecting the subsequently applied photographic emulsion. Gelatin, animal glue, starch, casein, shellac, acrylic resins, polyvinyl acetate resins may be mentioned as forming suitable barrier films.

It is obvious that the use of a barrier layer may be extended to other coated sheet materials in which it is desirable to have the base sheet dimensionally stabilized with a stabilizer which would adversely affect the coating material applied thereto. For example, some printing inks and dyes will exhibit color change on being contacted with certain of my stabilizing compounds.

Of course, when a completely developed print is being treated, all of the considerations having to do with an adverse action on the photographic emulsion can be ignored. Fully developed prints which have been thoroughly washed to remove the Hypo are then drained to remove excess water and immersed in a flattening solution comprising the present stabilizer compounds dissolved in water. One particularly suitable solution consists of 1 part of the monoethanolamine salt of polyethylene glycol 200 adipic acid monoester dissolved in 4 parts of water.

The prints are then drained again to remove the excess solution and transferred face down on a clean ferrotype plate for drying.

The prints so treated are very resistant to curling or cupping on being subjected to varying moisture conditions and are soft and pliable and exhibit resistance to cracking when bent or folded. The flattener imparts a smooth deep gloss to the prints which is distinctly superior to the surface shine of untreated prints.

It is desirable, however, to treat the base sheet prior to coating with the light sensitive emulsion because great difficulty is experienced during the final drying operation in the manufacture of photographic papers. Unless great care is employed and expensive equipment used, the prints will curl very badly, sometimes even to the extent of cracking the emulsion coating. This curling is largely prevented if the base sheet has been previously treated with a dimensional stabilizer of the present invention.

Again, with respect to the treating of cellulose products in general, it has been found that the treating compounds impart desirable qualities other than dimensional stabilization to the treated products. For instance, the resistance of the treated article to abrasion is markedly increased. This is particularly important when such products as punch cards for tabulating machines and playing cards are being treated.

Another important property of the stabilizing compounds is that cellulose materials impregnated therewith will not develop a static electrical charge. At the same time, the stabilizers provide an impregnated cellulose product having improved qualities of softness and flexibility.

Although not so important with respect to the finished article, it should be mentioned that the present stabilizers have pronounced anti-foaming characteristics when in solution. As a result, many auxiliary treating agents which would ordinarily cause objectionable foaming may be included in the impregnating solution. Examples of such agents are the protein compounds, glue and gelatin, mentioned earlier in the specification.

I claim:

1. The process of dimensionally stabilizing material composed of cellulose upon subjection of said material to varying humidity conditions, comprising impregnating said material with an aqueous solution of a salt formed by reacting an organic basic nitrogen compound selected from the group consisting of an alkanolamine containing a single amino group and a single hydroxy group substituted in each alkyl radical, an alkanol substituted polyamine, N-hydroxyethyl morpholine, an alkanol substituted glyoxalidine, 8-quinolinol, an alkanol substituted ammonium hydroxide, an amino glycol, an aminoaryl substituted aliphatic alcohol and an amino phenol with a partial ester of a polyhydric alcohol and a polycarboxylic acid, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $$\frac{1}{n}$$

where $n$ is the number of carboxyl groups in the said polycarboxylic acid; and drying the resulting impregnated material, said solution being of such concentration that the dried material contains 5 to 50% by weight of said salt.

2. The process of claim 1 in which said organic basic nitrogen compound is an ethanolamine.

3. The process of dimensionally stabilizing material composed of cellulose upon subjection of said material to varying humidity conditions, comprising impregnating said material with an aqueous solution of a salt formed by reacting an organic basic nitrogen compound selected from the group consisting of an alkanolamine containing a single amino group and a single hydroxy group substituted in each alkyl radical, an alkanol substituted polyamine, N-hydroxyethyl morpholine, an alkanol substituted glyoxalidine, 8-quinolinol, an alkanol substituted ammonium hydroxide, an amino glycol, an aminoaryl substituted aliphatic alcohol and an amino phenol with a partial ester of a polyhydric alcohol and a polycarboxylic acid, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $$\frac{1}{n}$$

where $n$ is the number of carboxyl groups in the said polycarboxylic acid, said solution also containing a water-soluble thermosetting resin selected from the group consisting of a urea-formaldehyde resin, a melamine-formaldehyde resin and a phenol-formaldehyde resin; and heating the resulting impregnated material to dry it and set said resin, said solution being of such concentration that the dried material contains 5 to 50% by weight of said salt.

4. A product produced by the process of claim 1.

References Cited in the file of this patent

UNITED STATES PATENTS

| Number | Name | Date |
|---|---|---|
| 1,780,375 | Bradley | Nov. 4, 1930 |
| 2,017,537 | Hoffman | Oct. 15, 1935 |
| 2,054,979 | Jahrstorfer | Sept. 22, 1936 |
| 2,067,219 | Whitehead | Jan. 12, 1937 |
| 2,085,706 | Schoeller | June 29, 1937 |
| 2,094,608 | Kritchevsky | Oct. 5, 1937 |
| 2,146,873 | Wilmanns et al. | Feb. 14, 1939 |
| 2,191,895 | Meigs | Feb. 27, 1940 |
| 2,288,413 | Morgan | June 30, 1942 |
| 2,386,446 | DeGroote | Oct. 9, 1945 |
| 2,481,692 | Schlosser et al. | Sept. 13, 1949 |
| 2,550,213 | Young | Apr. 24, 1951 |
| 2,575,195 | Smith | Nov. 13, 1951 |
| 2,628,937 | Paul | Feb. 17, 1953 |
| 2,629,701 | Ericks | Feb. 24, 1953 |
| 2,664,360 | Charles et al. | Dec. 29, 1953 |
| 2,683,132 | Cottle | July 6, 1954 |
| 2,699,406 | Rosser | Jan. 11, 1955 |
| 2,764,551 | Smith et al. | Sept. 25, 1956 |